US009019956B2

(12) United States Patent
daCosta et al.

(10) Patent No.: US 9,019,956 B2
(45) Date of Patent: *Apr. 28, 2015

(54) SELF-FORMING VOIP NETWORK

(71) Applicant: Dynamic Mesh Networks, Inc., Santa Clara, CA (US)

(72) Inventors: Francis daCosta, Santa Clara, CA (US); Sriram Dayanandan, Santa Clara, CA (US)

(73) Assignee: Dynamic Mesh Networks, Inc., Santa Clara, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 13/909,933

(22) Filed: Jun. 4, 2013

(65) Prior Publication Data
US 2013/0272296 A1    Oct. 17, 2013

Related U.S. Application Data

(63) Continuation of application No. 12/352,457, filed on Jan. 12, 2009, now Pat. No. 8,477,762, which is a continuation of application No. 11/266,884, filed on Nov. 4, 2005, now Pat. No. 7,583,648, and a (Continued)

(51) Int. Cl.
*H04L 12/66* (2006.01)
*H04L 29/06* (2006.01)

(52) U.S. Cl.
CPC ...... *H04L 29/06197* (2013.01); *H04L 65/1006* (2013.01); *H04L 65/1069* (2013.01); *H04L 65/1073* (2013.01)

(58) Field of Classification Search
USPC .................................................. 370/352, 401
See application file for complete search history.

(56) References Cited

U.S. PATENT DOCUMENTS

| 7,408,925 | B1 | 8/2008 | Boyle |
| 7,408,928 | B2 | 8/2008 | Bradd et al. |
| 7,443,842 | B2 | 10/2008 | Miyamoto et al. |
| 8,477,762 | B2 * | 7/2013 | daCosta et al. ............... 370/352 |
| 2008/0063001 | A1 | 3/2008 | Tanimoto |

(Continued)

OTHER PUBLICATIONS

Wikipedia Contributors, "Session Initiation Protocol" from http://en.wikipedia.org/wiki/Session_Initiation_Protocol, as shown on Jan. 12, 2009.

*Primary Examiner* — Albert T Chou
(74) *Attorney, Agent, or Firm* — Cherskov Flaynik & Gurda, LLC

(57) ABSTRACT

A self-forming VoIP connection capability is described that may be superimposed over wired networks, wireless networks, or combinations thereof. As described herein, a local network cluster forms while isolated from a conventional SIP server, or alternately may exist as a cluster of network nodes and clients that later becomes isolated from a conventional SIP server by a break in the network. Either way, each network node thus enabled with distributed SIP registry functionality according to this invention independently constructs a local SIP registry and SIP server capability within that node. Subsequently, while isolated from a conventional SIP server, VoIP conversations among client devices connected to nodes within an isolated cluster will continue, and nodes and clients may join or leave an isolated cluster with conversations able to be initiated or continued while a node has network connectivity to the cluster.

22 Claims, 5 Drawing Sheets

Related U.S. Application Data continuation of application No. 11/084,330, filed on Mar. 17, 2005, now abandoned, which is a continuation-in-part of application No. 10/434,948, filed on May 8, 2003, now Pat. No. 7,420,952.

(60) Provisional application No. 60/696,144, filed on Jun. 30, 2005.

(56) References Cited

U.S. PATENT DOCUMENTS

2008/0320148 A1    12/2008   Capuozzo
2010/0115107 A1     5/2010   Mitsuhashi

\* cited by examiner

Isolated node with 2 clients

SELF-FORMING VOIP NETWORK

CROSS REFERENCE TO RELATED APPLICATIONS

The instant application claims priority as a continuation of U.S. application Ser. No. 12/352,457, filed on Jan. 12, 2009, patented as U.S. Pat. No. 8,477,762 on Jul. 2, 2013, which in turn was a continuation in part of U.S. application Ser. No. 11/266,884, filed on Nov. 4, 2005, patented as U.S. Pat. No. 7,583,648 on Sep. 1, 2009, which in turn claimed the benefit of priority from U.S. Provisional Application No. 60/696,144, filed Jun. 30, 2005, and as a continuation in part of U.S. application Ser. No. 11/084,330, filed Mar. 17, 2005, presently abandoned, which in turn was a continuation in part of U.S. application Ser. No. 10/434,948, filed on May 8, 2003, patented as U.S. Pat. No. 7,420,952 on Sep. 2, 2008, all of which are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to voice communications over data networks and wireless data networks, also known as VoIP (Voice over Internet Protocol) communications, and in particular architectures that promote continuity of voice communication links when network connections to a central server conventionally required for VoIP communications (a Session Initiation Protocol or "SIP" server) are unexpectedly terminated or not yet established. Although much of this disclosure relates more directly to wireless networks, and wireless mesh networks in particular, such as in mobile applications, the embodiments described herein are applicable to both wired and wireless networks supporting VoIP, as well as other wireless network architectures such as point-to-multipoint, and others.

BACKGROUND

In a data network that supports VoIP communications, whether the network is wired or wireless or a combination of the two, the location of each VoIP client within the network topology is recorded in a central registry which acts like a "phone book" for the VoIP devices. This centralized registry is required by all state-of-the-art VoIP devices before VoIP communication between any of the devices may be established. This central registry is called the Session Initiation Protocol registry, or the "SIP" registry.

Per a wikipedia.org article, "Session Initiation Protocol (SIP) is a signaling protocol, widely used for setting up and tearing down multimedia communication sessions such as voice and video calls over the Internet. Other feasible application examples include video conferencing, streaming multimedia distribution, instant messaging, presence information and online games. The protocol can be used for creating, modifying and terminating two-party (unicast) or multiparty (multicast) sessions consisting of one or several media streams. The modification can involve changing addresses or ports, inviting more participants, adding or deleting media streams, etc."

Under the prior art, the SIP registry is located on a centralized server attached to the same network as any VoIP devices. If a client connected to a network node (the calling party) wishes to call another user (the receiving party) but the path between the calling party and the server containing the SIP server and SIP registry is broken, then the VoIP call is not possible with prior art network architectures. This is especially unfortunate if the network communications path between the calling party and the receiving party is still operational, but the sole lost connection is between the two parties and the SIP server. The loss of VoIP operation is especially vexing if the communication system is mission critical and lives or property are on the line. In these situations, a more versatile and reliable solution is needed.

The requirement of one or more centralized SIP servers are discussed in several prior art references. For example, a recently granted patent, U.S. Pat. No. 7,408,928 to Bradd, et. al., describes a method of overcoming the difficulties created by communication with one or more centralized SIP servers when the central SIP servers serve networks with conflicting address domains. Bradd teaches that the "the call servers also need to be reachable from the media gateways within their respective associated networks." Col. 4, Lines 65-67.

The joining of networks containing VoIP devices is traditionally solved by the installation of an intermediary which directs traffic from one network and unto another network. For example, U.S. Pat. No. 7,443,842 to Takashi Miyamoto, discusses a central "control apparatus" which facilitates communication between IP devices in two different networks. The instant invention eliminates the need for a central control apparatus, as this prior art patent teaches.

Further prior art approaches rely on proxy servers. A proxy server is a type of intermediary service which forwards requests from clients to a server and any responses from a central server to clients. Proxy servers, contrary to this invention, nonetheless require a connection to a central server. While some proxy servers may cache requests and responses when communications with the central server are interrupted, an approach relying on proxy servers nonetheless requires one or more central servers. The instant invention facilitates communication in circumstances where a central server is consistently absent.

A mission critical situation involving wireless communication might include a group of first responders arriving on a scene where no backhaul connection is available or has yet to be established. Here, one network node may exist on a vehicle and other network nodes may exist as part of units carried by personnel on the scene. These nodes could form an isolated cluster. However, under the prior art, it is not possible to establish VoIP sessions between VoIP devices associated with each node comprising the isolated cluster until a SIP server is also connected to the isolated cluster. Other than first responders, soldiers in the field may encounter a similar scenario. Further, the isolated cluster may be initially in communication with a SIP server through a backhaul connection, but that backhaul connection is later lost due to movement of the network nodes or a failure of the backhaul communications link. A further scenario involving wired communications, or a combination of wired and wireless communications, could involve a campus network. Here, a building or group of buildings having a wired network infrastructure may act as an isolated cluster for VoIP communications within that cluster when the backhaul connection to a SIP server which is external to the building or group of buildings is no longer available.

SUMMARY

As used herein, a "node" may include any of a number of network connectivity elements. If used in a wired environment, the node could be a network hub, a network switch, or a computer connected to the network. If wireless, the node could be an access point, a base station, a mesh node, a computer incorporating one or more wireless network interfaces and other such devices. A VoIP "client" may be any user I/O device capable of sending or receiving VoIP (IP phone, cell phone with network connectivity, PC/laptop which includes sound recording and output means, and other devices) conversations. A VoIP client may connect to a node, or may be physically combined with a node. For instance a portable wireless VoIP client unit used in military of first responder applications, especially if designed for conveyance by personnel, may also incorporate a mesh relay node. "SIP registry information" as used herein, may include, for instance, the hardware (commonly-referred to as a device's "MAC address") and IP addresses, and/or other information that is required in order to initiate and maintain VoIP communications between two or more VoIP client devices.

The application further describes communications between network components. Various methods of communication may be employed to implement the communications exchanged by the components of this invention, including but not limited to broadcast User Datagram Protocol (UDP) datagrams, exchanges of data using Transmission Control Protocol (TCP) connections, or other protocols. Any network communications protocol may reasonably be employed, and the choice would depend on a number of considerations such as the type of network involved in a particular deployment. For example, in deployments where reliable physical connectivity between network elements is not a problem, such as in a wired network application or a fixed-point wireless mesh, network communication protocols involving less overhead, such as UDP, may be used. In circumstances where continuous network connectivity cannot be assured, such as a mobile mesh application, network connection protocols which ensure complete receipt of data, akin to TCP socket-based communication, may be employed. Further, given the features of the instant invention, such as the use of sophisticated mesh nodes, the communication protocols may be tailored to the individual circumstances of each deployment. Therefore, some embodiments of the invention are capable additional features, such as fully encrypted communications.

The embodiments described for this invention utilize a "distributed SIP registry" functionality which is created by a self-forming methodology. The underlying basis of the network topology is a set of interconnected "nodes," wherein VoIP client devices gain connectivity to a network (either a local network or a wider network, such as the Internet) through communication with a nearby "node." In one embodiment, the nodes are wireless mesh access points which feature additional software and/or hardware elements used to support the features of the instant invention. However, as was discussed above, the nodes may be elements of a wired network, in which case the nodes would be a wired network switch, hub, gateway, or the like with the additional software and/or hardware elements used to support the features of the instant invention.

There are at least two scenarios of operation for the invention described herein—a first configuration under which a group, or cluster, of network nodes are initially isolated, and a second configuration in which the cluster is further in communication with an external SIP server containing some initial SIP registry. In both cases, each node within the cluster of nodes builds its own local SIP registry, thus self-forming a VoIP capable network where only a data network existed previously. Where the cluster of nodes is in communication with the external SIP server prior to an isolation event, communications by way of nodes outside the not-yet-isolated cluster will include information from the external SIP server, which has knowledge of nodes and clients located outside the cluster.

In one scenario the cluster of nodes is initially intact and the nodes are initially in communication with an external SIP server containing an initial SIP registry. During this configuration, portions of the initial SIP registry that pertain to those network nodes are stored in the local SIP registries of the respective nodes, in a manner that does not require a dedicated communication path to be established between the external SIP server and each node within the cluster. If one or more network nodes later become isolated from the path to the external SIP server, any VoIP clients connected to an isolated node or nodes that form an isolated cluster with network connections within the isolated cluster can still initiate and continue VoIP conversations within the isolated cluster. According to this invention, each isolated network node will contain the relevant portions (i.e. the information regarding the isolated node's clients) of independently stored SIP registry information contained in the external SIP server. Therefore, each local node's VoIP clients can locate each other even after the connection to the external SIP registry is severed. If there are three or more isolated mesh nodes in a cluster of isolated mesh nodes, then a pure relay node (i.e. a node not in communication with any clients) in the isolated cluster will understand to which node to send a VoIP packet it receives.

The manner in which each network node with distributed SIP registry capability will build its local SIP registry is not to simply copy a portion of the registry information contained in the external SIP server. As described earlier in the background section of this specification, the purpose of having a self-forming VoIP network with distributed SIP functionality is to support mission-critical applications where maintaining voice communication amongst local VoIP clients connected to isolated network nodes is critical, and sometimes life-saving. For applications such as mobile first responders or workers deep in a coal mine, the connection to an external SIP server may be lost at any moment. When this happens, there is no guarantee that the SIP registry information at that external SIP server is in fact up-to-date given the constantly changing topology of the mobile network. As a result of this, the invention described herein builds and constantly updates local SIP registry information in each network node without the requirement to access the SIP Registry in an external or primary SIP server.

Under a first scenario, when a network node according to this invention is initialized, usually at a power-on event, the node will immediately initiate a local SIP registry by exchanging VoIP-related address information with its local clients and between itself and other nodes in an isolated cluster, as well as any external SIP registry in communication with the node. As such, during initialization and at other stages of operation, each node can obtain information about clients from three sources. First, the node builds its own local registry by querying any clients in communication with the node. When a node determines that a new client is in communication with the node, the node updates its own registry as well as communicating with the remaining nodes about the presence of the newly-discovered client. Therefore, the second source of registry information is the updates sent from other nodes. Finally, a node may receive information about clients connected to an external SIP registry instead of another node. These clients are external to the node's local cluster. Every time a network node thus enabled acquires a new piece of SIP registry information, it broadcasts that information in a broadcast information packet to other nodes similarly enabled with distributed SIP capability. Upon receiving one such special packet and learning a new piece of SIP registry information from another network node, the other node will update its own local SIP registry with that new information.

Thus, each network node with distributed SIP capability communicates with other similarly enabled nodes, and through these observations and interactions, each builds a local SIP registry with current information. Then, if suddenly disconnected from an external SIP server, each node will enter the period of isolation with the most current SIP registry information always available to it, and will itself be capable of functioning as a SIP server. Once a cluster of similarly enabled network nodes has been isolated from an external SIP server, each node in the isolated cluster will continue to observe all VoIP traffic and update its local SIP registry, again immediately broadcasting any newly discovered SIP registry information to all other nodes in the same isolated cluster. When such a cluster of nodes is in contact with an external SIP server, the external SIP registry may be updated from time to time with registry information contained in the nodes within the cluster. This can help insure that the External SIP registry has the most up to date information, or if an isolated cluster re-connects with the network containing the external SIP server, so that the external SIP server contains the current information on all clients and nodes within the previously-isolated cluster.

A second scenario exists for this distributed SIP registry functionality where initially, no connection exists to an external SIP server. In this scenario, one or more network nodes enabled with distributed SIP functionality is initialized or powered-on without being connected to an external SIP server. These one or more network nodes then proceed to observe, broadcast, and receive SIP registry information within the isolated cluster—essentially self-forming VoIP connectivity. For instance, a first node might power up and find that no other nodes exist within communication range. However, a first VoIP client is connected to this node, so immediately the first node discovers the IP address and MAC address of this first client and places this information into its local SIP registry. If the first client has not been assigned an IP address, a DHCP server (Dynamic Host Configuration Protocol) incorporated into the first node can assign one. A second VoIP client connected to this node will similarly be discovered, its address information exchanged with the node with appropriate address information also added to the local SIP registry on the node. Subsequently, these first and second clients may communicate with each other through the first isolated network node, where the node functions as a SIP server, even though there is no connection to any external SIP server. This scenario of direct communication is not possible with prior-art VoIP implementations.

Building on the scenario of the preceding paragraph, if a second similarly enabled and isolated network node comes into contact with the first node, the two nodes will each broadcast their current SIP registry information to the other node, and subsequently each node will update its local SIP registry with the newly acquired information. In a like manner, information will be updated as nodes join and leave the isolated cluster, either establishing or terminating communication with the nodes within the cluster. When SIP registry information is broadcast throughout the isolated cluster, or as part of a status packet broadcast at regular intervals, each node will broadcast which nodes are currently connected to it. Accordingly, a node which has broken its connection(s) with all nodes within the isolated cluster will no longer appear or have its clients appear in any of the local SIP registries.

A network node which is enabled with local SIP registry capability may build and update a local registry at all times, or alternately only when the node lacks a direct communication path to an external SIP server. Network nodes thus enabled may be constructed with a flag to determine whether the local SIP registry is enabled at all times or only when isolated.

An object of the present invention is to provide means to facilitate VoIP communications between clients of VoIP nodes when communication with a SIP server connected to an external network is not available. A feature of the invention is that each VoIP node functions as an autonomous SIP server. An advantage of the invention is that the VoIP clients in communication with the VoIP node are able to establish VoIP communication by using the local SIP server of the node.

Another object of the present invention is to facilitate VoIP communication with standard VoIP client communication devices. A feature of the invention is that the SIP server contained within each VoIP node is transparent to the VoIP clients. An advantage of the invention is that the VoIP clients do not require any modification to communicate with the VoIP nodes containing distributed SIP registries.

Yet another object of the present invention is to support VoIP communications between VoIP nodes and clients associated with different VoIP nodes. A feature of the instant invention is that a first VoIP node exchanges SIP information with the remaining VoIP nodes in communications with the first VoIP node. An advantage of the invention is that the nodes in communication with one another form a decentralized SIP servers, not dependant on a connection to any one node or an external SIP server.

Another object of the present invention is to ensure that the local registry of each VoIP node is current. A feature of the present system is that each change in the local SIP server of a VoIP node is broadcast to the remaining nodes in the cluster. An advantage of the invention is that the nodes in communication with one another contain up-to-date local copies of the SIP registry.

Yet another object of the invention is to allow the entries of the external SIP server database to be updated upon the establishment of a connection between an external SIP server and a cluster of nodes, wherein the cluster of nodes was previously disconnected from the external SIP server. A feature of the present invention is that the SIP registries within each node are compatible with pre-existing servers. An advantage of the instant invention is that the distributed SIP registries are compatible with networks currently deploying centralized SIP servers.

In brief, the invention consists of a VoIP-capable network comprising one or more VoIP client devices, two or more VoIP nodes forming an isolated cluster wherein the two or more VoIP nodes in the isolated cluster are in communication with one another, wherein each of the VoIP client devices communicates with at least one VoIP node, wherein each of the VoIP nodes further comprises a local SIP registry built by exchanging SIP information with the remaining VoIP nodes in the isolated cluster, and wherein a first VoIP client device in communication with a first VoIP node establishes a communication with a second VoIP device in communication with a second VoIP node using the local SIP registries of the first VoIP node and the second VoIP node.

In another embodiment, the invention consists of a method of maintaining VoIP capabilities within a network comprising forming a cluster of two or more initially isolated network nodes establishing communications between two or more client devices by way of the initially isolated network nodes, wherein in a first configuration, at least two of said initially isolated network nodes are in communication with each other but not in communication with an external SIP server, and wherein each of said at least two initially isolated network nodes supports VoIP communications based on a local SIP registry contained in each of the said nodes according to the method of communicating with at least one other initially isolated node to exchange SIP registry information, updating the local SIP registry in said node as new information is acquired, sending and receiving VoIP packets from a sender isolated node to one or more recipient isolated nodes based on said local SIP registry functionality when a client device in communication with the sender node establishes communication with a client device in communication with the recipient node.

In yet another embodiment, the invention consists of a VoIP capable network comprising a first initially isolated network node in communication with at least two VoIP clients, wherein the first isolated node further comprises a local SIP registry wherein said SIP registry contains address identifiers for each VoIP clients in communication with the first node, wherein VoIP conversations between said at least two VoIP clients are initiated by utilizing the local SIP registry.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION OF THE INVENTION

Figure 1:
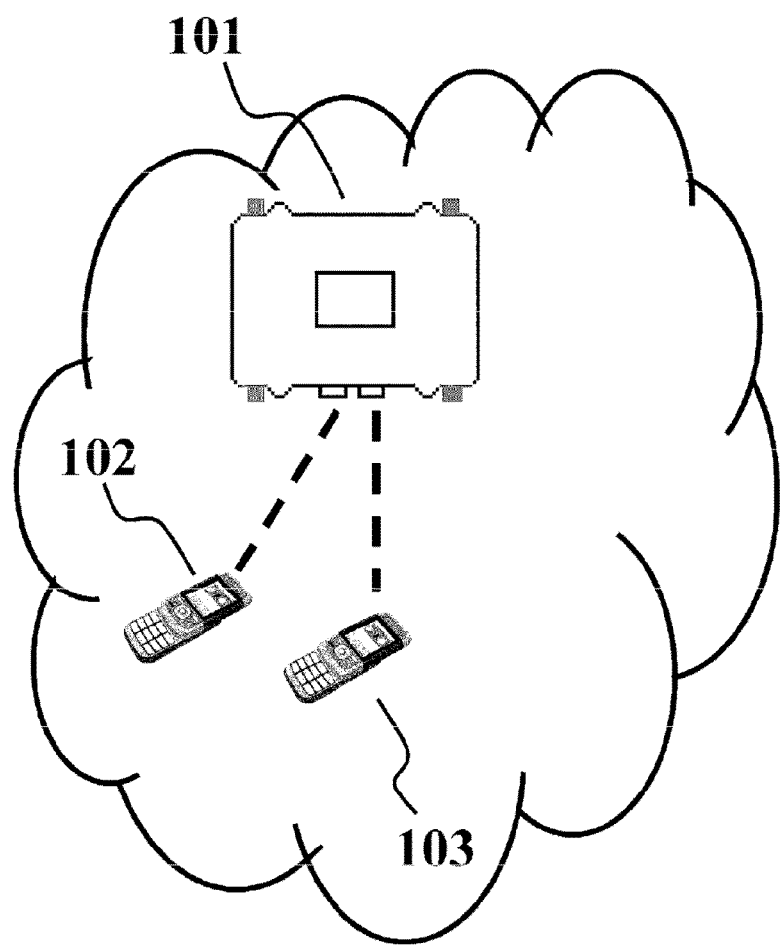
FIG. 1 shows a minimal configuration for an isolated network cluster whereby a single isolated node facilitates communication between two isolated VoIP clients.

FIG. 1 shows the simplest form of a self-forming VoIP network according to this invention. In this figure, a single network node 101 contains a SIP registry as well as means for updating the registry (not shown). A first VoIP client 102 and a second VoIP client 103 are in communication with the single network node 101.

In mobile scenarios such as those for first responders or soldiers, initially no clients may be communicating with the first node 101. A first VoIP client, such as client 102, may establish connectivity with node 101 and exchange identifying information with the first node 101 thereby updating the SIP registry of the first node 101. However, until a second VoIP client 103 also establishes communications with the single network node 101, a VoIP conversation is not feasible. In one embodiment of the invention, the single network node 101 may include an integral VoIP client (not shown), as in the case of a mesh node carried by personnel wherein the wireless mesh node includes a communication headset, or alternately a wireless mesh node mounted on a vehicle that includes a wired communication headset connected to an integral VoIP client function incorporated into the mesh node. Once a second client 103 is available, a call originating from client 102 will contact the local SIP server on the single network node 101, and since the SIP registry of node 101 contains the IP address and the hardware address for clients 102 and 103, a VoIP conversation between clients 102 and 103 is possible.

In every embodiment of the invention, the clients 102 and 103 may be conventional VoIP client devices which normally require communication with an external SIP server. While the single network node 101 needs to contain the local SIP logic, the clients 102 and 103 are not necessarily aware that the SIP server uses a distributed paradigm of this invention. Therefore, while the present system supports custom clients, such as ones integral to the node 101, the system will also operate with completely conventional clients 102 and 103, such as a standard VoIP equipped cellular phone depicted in FIG. 1.

The local SIP server within the network node 101 can communicate with the client devices 102 and 103 using any transport layer, such as TCP, UDP, or SCTP. As potentially conventional clients, the client devices 102 and 103 are not required to adopt any special communication protocol with the local SIP server. Instead the client devices employ the same communications commands and protocols as the client devices would if the client devices 102 and 103 were communicating with a prior art SIP server. Therefore, the current invention does not include any additional agents or supplementary services that run within each client, in conjunction with or on top of the SIP environment.

Further, while the SIP server acts as a transparent means for the client devices 102 and 103 to communicate with one another, the SIP server is not a SIP proxy. A SIP proxy is a device that acts as both a client and a server completing calls on behalf of another client. While some nodes may include an integral client, the node itself still acts as a full-fledged SIP server. A SIP proxy server requires the presence of a stand-alone SIP server to complete calls. The local SIP server within the node 101 acts as a stand-alone server in that it allows the completion of calls without an external SIP server, and is therefore not a mere proxy server.

Figure 2:
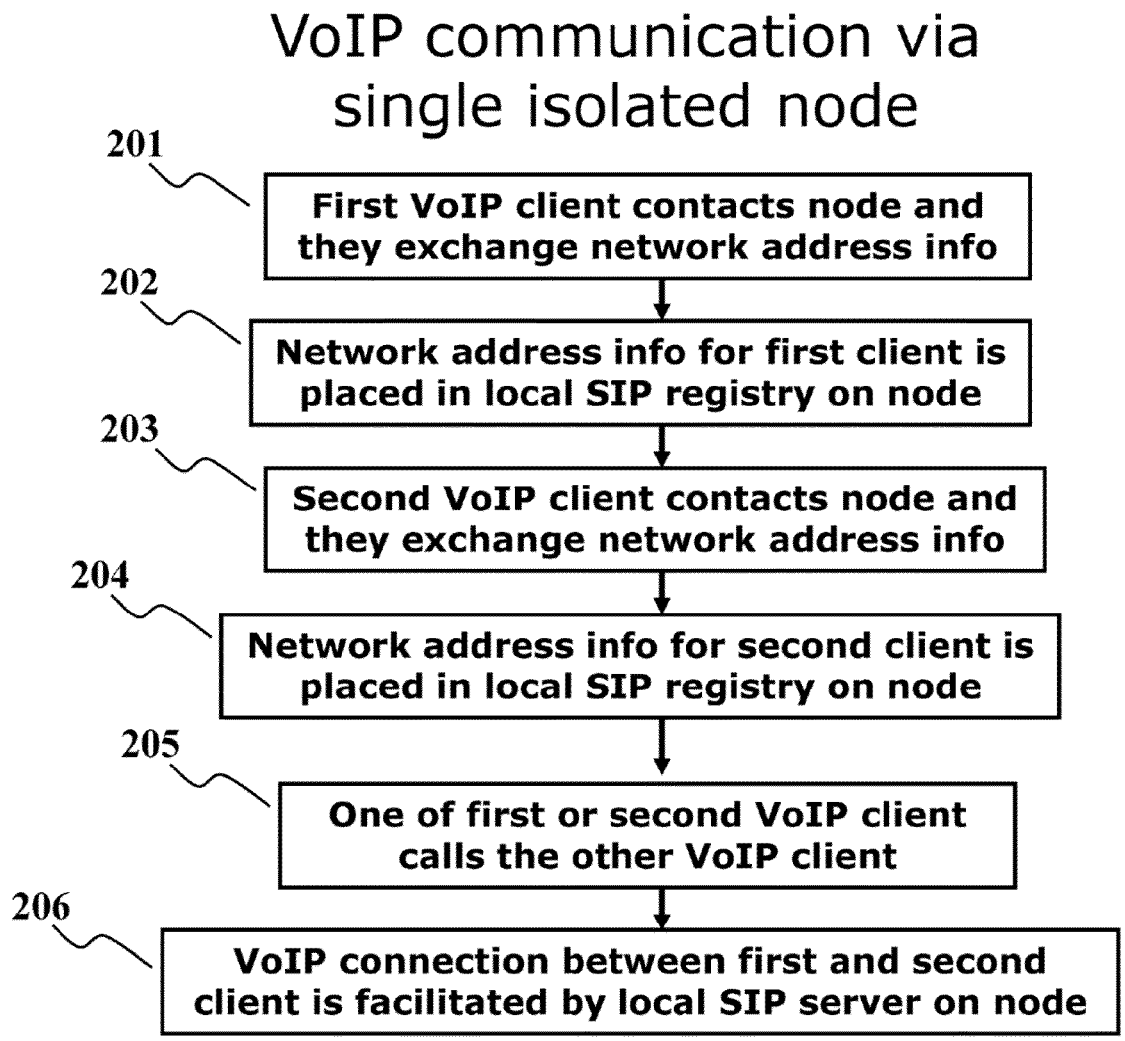
FIG. 2 shows a flowchart for a method whereby the single isolated network node of FIG. 1 forms a VoIP network enabling communication between two VoIP clients.

FIG. 2 shows a flowchart describing the method whereby clients 102 and 103 in FIG. 1 establish the SIP registry entries necessary for VoIP communication.

For illustrative purposes, the flow chart of this and other figures depicts a process with a clear order of events. It should be understood that some of the steps of the method described by this invention may occur concurrently or even out of the order, depending on the real-world circumstances of the network.

In a contact step 201 a VoIP client connects to a node and the client exchanges its network address information with the node. This may include the client providing its MAC address to the node and also an IP address, but only if the client is preconfigured with an address. If no IP address has been previously established, the node may also incorporate DHCP server capability wherein the node assigns IP addresses to its clients. In a SIP entry creation step 202 network address information such as the hardware address and IP address for a client is placed in the local SIP registry on node. Following lapse of some time, in a subsequent contact step 203 a second or subsequent VoIP client such as client 103 shown in FIG. 1 connects to the node. The subsequent client exchanges its network address information with the node. Analogously as for the first client, the node then updates its local SIP registry as part of the subsequent SIP entry creation step 204. Steps 203 and 204 are repeated for every client that is in communication with the node. In a call initiation step 205, with one of clients initiates a VoIP phone call to another client. As part of a SIP lookup step 206, the SIP registry within the node is used to establish a connection between the clients.

Figure 3:
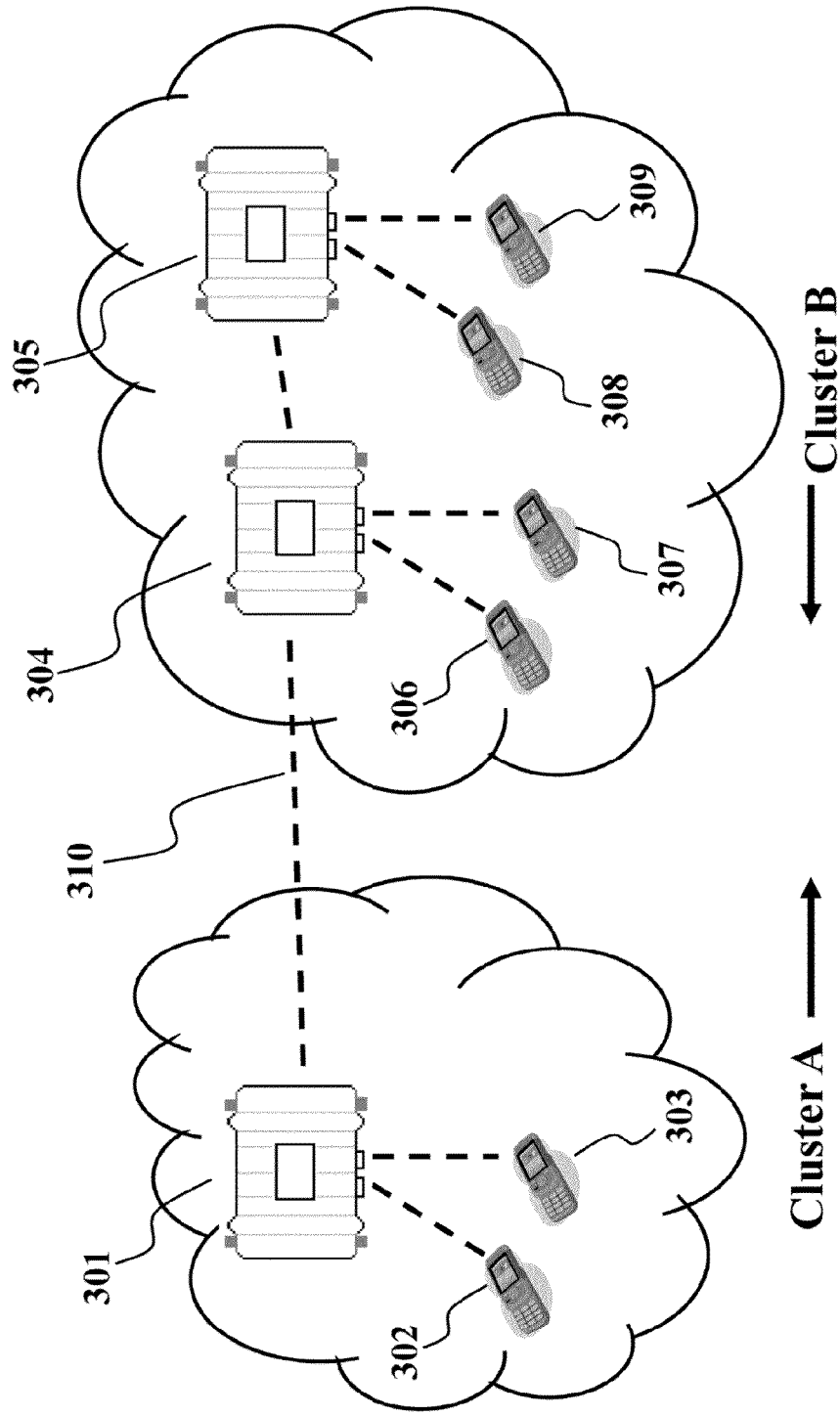
FIG. 3 shows two isolated clusters of wireless network nodes which have moved within range of each other and now may join together to form a new single isolated cluster of network nodes with VoIP communications between all clients connected to nodes within the new single cluster.

FIG. 3 depicts an embodiment of the invention which supports the scenario where two isolated clusters of network nodes join together upon the establishment of network communication between the two Clusters. Cluster A contains network node 301 and two VoIP clients 302 and 303 in communication with the Cluster A node 301. Cluster A Node 301 contains a local SIP registry (not depicted) and the Cluster A Node 301 local SIP registry contains information regarding Cluster A node 301 clients 302 and 303 in communication with the Cluster A node 301.

Cluster B comprises two nodes 304 and 305 wherein the Cluster B nodes 304 and 305 are in communications with each other. In one embodiment, Cluster B nodes 304 and 305 connect to one another using a wireless network connection, while in another embodiment, Cluster B nodes 304 and 305 are connected together using a wired connection. The first Cluster B node 304 is in communication with its clients 306 and 307. The second Cluster B node 305 is in communication with clients 308 and 309. Therefore, during the initiation of Cluster B, the first node 304 detected and recorded information regarding clients 306 and 307 into node 304 local SIP registry, while the second node 305 detected and recorded information regarding its clients 308 and 309.

Following the initiation of the Cluster A node 301 local SIP registry, Cluster A node 301 detects a neighboring Cluster B node 304 and establishes a new network connection 310 between Cluster A node 301 and Cluster B node 304. At a time prior to the formation of a new network connection 310, the local SIP registry within node at 301 does not reflect any information regarding the Cluster B VoIP clients, and the local SIP registries in Cluster B nodes 304 and 305 contain no information regarding VoIP clients of Cluster A. However, following the establishment of the new network connection 310 the local SIP registries of Cluster A and Cluster B nodes are updated to reflect the information of all client devices in contact with nodes comprising Cluster A and Cluster B thereby facilitating communications between any of the clients 302, 303, 306, 307, 308, and 309 present in the system.

Therefore, under the present system, communication between Cluster A and Cluster B clients becomes possible without a central server. Instead, the establishment of network communications between the two previously-separated clusters is all that is required. In other words, there is no need for a central control apparatus to oversee the communications between Cluster A and Cluster B. Upon joining of the two networks, SIP servers contained in Cluster A continue to operate and exchange information with the SIP servers contained in Cluster B. In one embodiment of the invention, there is no requirement that one or more of the servers be chosen to be a predominant SIP server. Instead, the servers exchange information with one another in an ad-hoc basis.

In other words, the integral SIP servers do not operate as proxies of one another. If, contrary to the instant invention, the SIP servers were merely proxies, then a connection to one central SIP server would be required and all servers integral to individual nodes would merely forward data to the one or more central servers. Instead, in the instant invention, the SIP servers cooperate with one another as peers, with each peer SIP server containing all necessary functionality.

Figure 4:
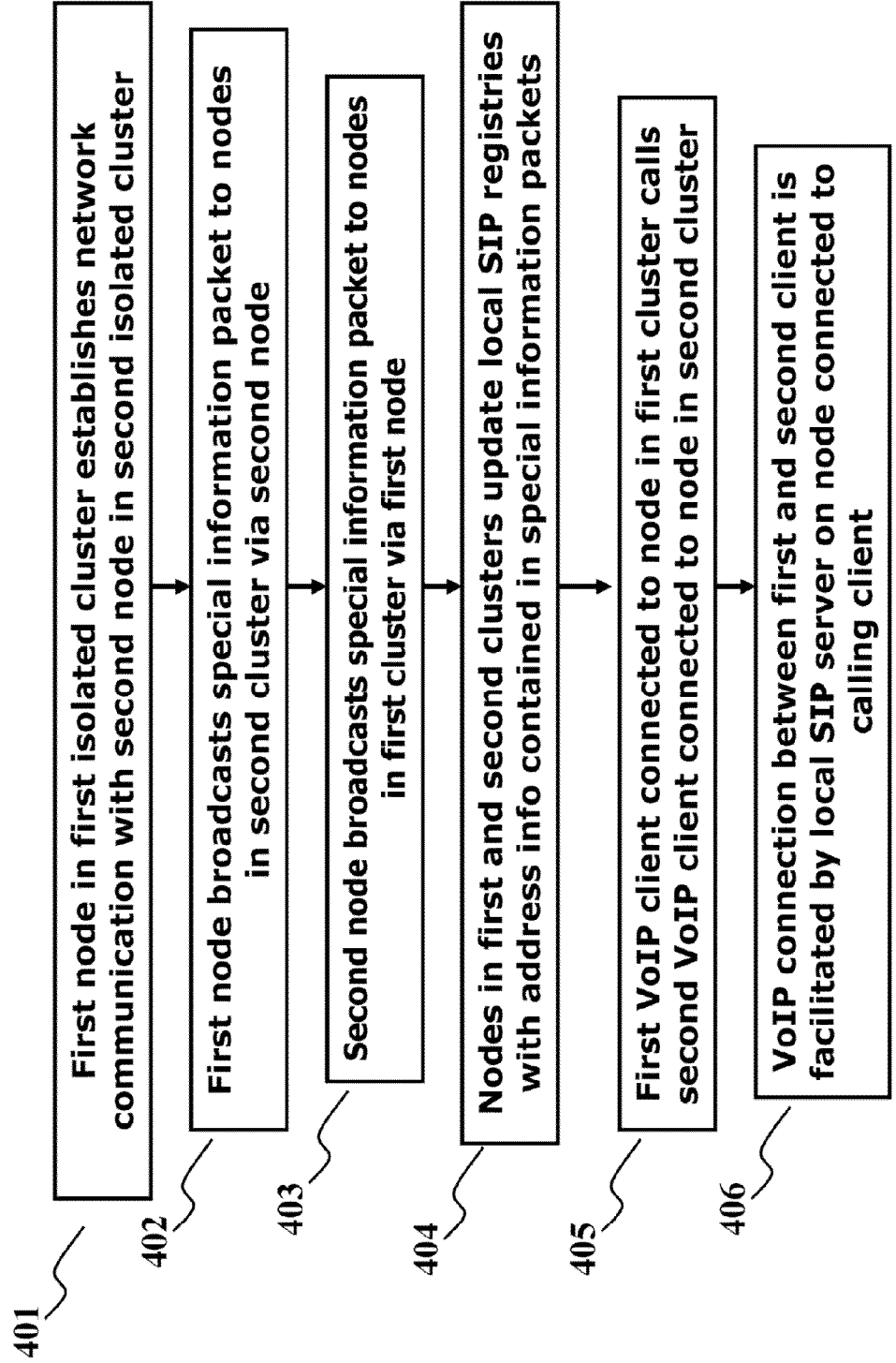
FIG. 4 shows a flowchart for a method whereby the two isolated network clusters of FIG. 3 may join together and operate as a single isolated cluster and VoIP network.

FIG. 4 is a flowchart describing the method whereby two clusters of VoIP nodes, such as cluster A and cluster B of FIG. 3 establish communication, reconcile information in the local SIP registries in the VoIP nodes within both clusters, and enable VoIP clients previously within one cluster to communicate with VoIP clients that were previously isolated within the other cluster. In the cluster communication establishment step 401 a first node within one isolated cluster, such as node 301 of FIG. 3, establishes network communication with a second node, such as node 304, in another isolated cluster. In the first exchange of information step 402, the first node broadcasts a special information packet containing SIP registry information to the second node within the other cluster. This second node will eventually propagate the updated SIP information to all other nodes, including all of the nodes in the second cluster. In the second exchange of information step 403 the second node 204 will then broadcast a special information packet also containing SIP registry information to all the nodes it is in communication with, including those in the cluster containing the first node. Thereafter, as part of the SIP update step 404, all nodes similarly enabled with local SIP registries will update their respective local SIP registries and will a broadcast special information packets to all other nodes they are in communication with, so that each VoIP node contains an updated version of the SIP registry. As shown in the call initiation step 405 a first VoIP client connected to a node previously in a first cluster may place a call to a second client previously located in a different cluster. Finally per the call completion step 406, a VoIP connection is then maintained between the first and second clients, facilitated by local SIP server functionality located on the node connected to the calling client.

In order for any network client device to communicate with another network client device using a modern protocol, each network client device must be assigned a unique identifier. For example, in an IP-based network, each network devices is assigned a unique IP address. IP addresses can take different forms. For example, under the IPv4 addressing scheme, an IP address is a set of four numbers separated by periods. Each number ranges from 0 to 254 (or 255 depending on the standard), i.e. in generic terms an IPv4 address is:

A.X.Y.K wherein A, X, Y, and K are integers from 0 to 255.

Valid IPv4 addresses include 151.207.245.67 (one of the addresses currently assigned to uspto.gov) and 193.5.93.80 (one of the addresses currently used by WIPO).

Other network client identification schemes exist and serve the same purpose as the IPv4 numbering scheme. For example, IPv6 uses eight groups of four hexadecimal digits (wherein each group is separated by a colon) to identify network clients.

Regardless of the identification protocol used, in order for VoIP devices to communicate with VoIP nodes, each VoIP client device and each VoIP node must be assigned an IP address. While it is possible to manually assign IP addresses to devices, this manual apportionment of addresses creates significant overhead in that each device must be tracked and its IP address assignment recorded so as to ensure that no two devices are assigned the same IP address.

In order to avoid manual assignments of addresses, wired networks employ network-wide services such as DHCP to assign IP addresses to clients. There is typically only one DHCP server in a facility to ensure no IP conflicts are created. While wired networks may employ a single DHCP server, however isolated networks have no access to a single server.

Therefore each isolated network node servicing clients according to the instant invention will include its own DHCP server.

When cluster A and cluster B of FIG. 3 establish network connectivity for the first time, there is a possibility of IP address conflicts between the client devices, especially if the nodes rely on a conventional DHCP server. An enhanced DHCP server is discussed infra. A conventional DHCP server may have previously assigned addresses to clients in either cluster, and inadvertently assigned redundant addresses. To avoid this problem, a method for assigning IP address is therefore disclosed for the distributed DHCP server capability in network nodes according to this invention.

While an IP address conflict may be resolved through arbitration, prevention of address conflicts is preferable. An approach to reducing the probability of a conflict to less than 1 in $2^{15}$ is described. Note that the same approach may be used to reduce the probability even further to 1 in $2^{32}$ or lower. Further, the approach is applicable to any device network identification scheme, such as IPv4 or IPv6.

The reduction in the probability of a conflict is accomplished by splitting up the IP domains in an autonomous and randomized manner such that each mesh node has a range of IP addresses that it can freely assign to clients with de minimis risk of IP conflicts occurring. Each mesh node randomly selects a DHCP range to assign client addresses. As part of the process of discovering and connecting with new network nodes, this DHCP range is broadcast in a special information packet to other nodes when the node is scanning to join other nodes. If there is a conflict in the range, it is resolved by one node selecting a new DHCP address range, a random number range set is selected and tie breaker functions are employed, and before the nodes become part of the same network. This pre-emptive measure ensures minimal disruption of client services.

IPv4 addresses assigned by DHCP servers take the form A.X.Y.K. wherein each number is an integer from 0 to 255. Let A arbitrarily be set based on a customer identifier for the mesh network layout. K is chosen as an identifier for a client attached to the network node. Therefore, each client of a single node will share the same first three digits of an IP address, with the last digit "K" being incremented for each client device connected to a single node.

With A and K selected, X and Y combinations provide a total of 2*16 integers or $2^{32}$ possibilities. This amounts to over 65,336 network nodes coexisting in the same place each with up to 255 clients each with no inherent IP conflicts.

Let us assume that a 15 bit random number generator is used to generate the values for X and Y at each isolated network node. Sections of the random number may be used to set the values for X and Y for the DHCP server at each node. Let M and N be the decimal equivalent of the 7 MSB and 8 LSB of the 15 bit random number. The DHCP address space is then:

A.[255-M].N.0 to A.[255-M].N.254 where 0<=M<=127 and 0<=N<=255

This allows for a network of up to 32768 network nodes with distributed DHCP capability—each of them having up to 255 clients each.

Figure 5:
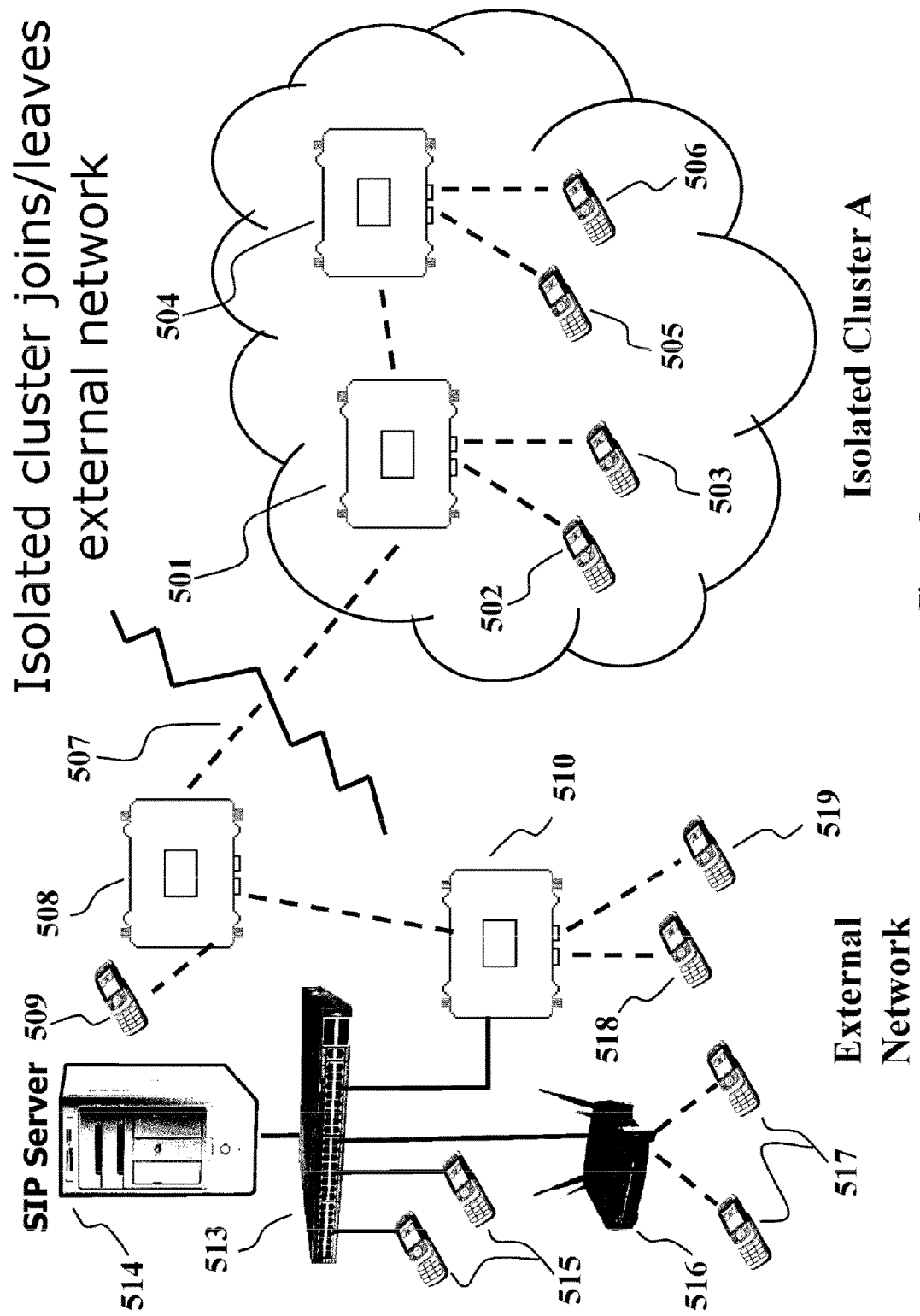
FIG. 5 shows an isolated cluster of network nodes with VoIP capability where the isolated cluster is either initiating communications or ending communications with external network where the external network contains a conventional SIP Server.

The diagram of FIG. 5 can be used to describe two operational scenarios of an embodiment of the invention. In a first sequence of operation or first scenario, an isolated cluster of network nodes such as cluster A comprising a self-formed VoIP network establishes a network connection with an external network that contains a conventional SIP server. Under a second sequence or second scenario, FIG. 5 can also be used to describe the response of the system to an event wherein a portion of a network loses its communication links to a main network and thus becomes isolated.

Looking at the first scenario, the first isolated cluster comprises Cluster A network nodes 501 and 504 which are used for VoIP communications with at least four Cluster A clients depicted as 502, 503, 505, and 506. In this scenario, the nodes comprising Cluster A are initially isolated from any other nodes and the Cluster A clients are only capable of intra-Cluster A communication and the communications amongst Cluster A client devices 502, 503, 505, and 506 has been possible due to the presence of local SIP registries and SIP server functionality contained in Cluster A nodes 501 and 504. Upon establishing an External network connection 507 with an External network node 508 belonging to the external network, isolated Cluster A may now communicate with VoIP clients located within, or connected to, the external network. For example, Cluster A VoIP clients such as client 502 may connect with client 509 attached to the External node 508, clients 518 and 519 attached to node 510, client 517 attached to wireless access point 516, client 515 attached to VoIP switch 513, or any VoIP client that the main SIP server 514 contains SIP registry entries regarding, including clients that may be reachable through the Internet (not pictured).

Upon the establishment of the External network connection 507, the local SIP registries in Cluster A nodes 501 and 504 would supply their current SIP registration information to the main SIP server 514 such that the main SIP server 514 may have the benefit of the latest information. After becoming connected to the external network through the establishment of External Network Connection 507, network nodes within previously isolated Cluster A will continue to maintain their local SIP registries and communicate SIP registry information among themselves in order to remain best prepared for operation in an isolated manner should the External Network Connection 507 be lost as can happen pursuant to the second scenario described below.

Conversely, the second scenario starts with Cluster A connected to the external network through at least one External Network Connection such as 507, and even though VoIP clients contained within Cluster A initially have access to the main SIP server located on server 514, nodes in cluster A build and maintain their own local SIP registries according to this invention, essentially a self-forming VoIP network. This self-formed VoIP network will serve clients, such as the depicted clients 502, 505, and 506 of the nodes 501 and 504 in Cluster A with the most recent SIP information, especially in view of changes due to the roaming of nodes and clients in mobile situations. In addition, the self-formed VoIP network also maintains readiness for separation from the external network, which may occur at any time, especially in mission critical mobile networks.

FIG. 5 depicts Cluster A comprising nodes 501 and 504. Cluster A may contain any number of nodes, and each node may contain any number of clients, such as clients 502 and 503. Further, during different time periods, participation within a cluster may change as nodes begin and end wireless communication with one another. If for instance, at a first point in time, a, node 504 and the clients associated therewith are moved out of range of the communications link with node 501, the local SIP registry in node 504 will cease receiving updates from node 501. While communication between clients 505 and 506 would be possible, given that at time α, both continue to be associated with node 504, node 504 clients 505 and 506 cannot communicate with the remaining clients depicted in FIG. 5. Therefore if at a time interval β, wherein time β follows time interval α, a new client (not depicted) joins node 501, node 504 is not aware of the new client's location. However, if at a time interval γ, wherein γ occurs after β, the node 504 rejoins the Cluster A, node 504 receives the updated SIP registry from the node 501 which remained within Cluster A. Therefore, starting with time interval γ, clients of the previously removed node 504 would be once again able to communicate with all the other clients.

Thus, the foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, unless otherwise specified, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A VoIP-capable network comprising:
   one or more VoIP client devices;
   two or more VoIP nodes forming an isolated cluster wherein the two or more VoIP nodes in the isolated cluster are in communication with one another;
   wherein each of the VoIP client devices communicates with at least one VoIP node;
   wherein each of the VoIP nodes further comprises a local SIP registry built by exchanging SIP information with the remaining VoIP nodes in the isolated cluster; and
   wherein a first VoIP client device in communication with a first VoIP node establishes a communication with a second VoIP device in communication with a second VoIP node using the local SIP registries of the first VoIP node and the second VoIP node; and wherein said client device communications is maintained regardless of network connectivity status.

2. The VoIP-capable network of claim 1, wherein the local SIP registries of the isolated VoIP nodes are updated as the VoIP nodes and the VoIP client devices begin communication with the isolated cluster and end communication with the isolated cluster.

3. The VoIP-capable network of claim 1, wherein updates to the local SIP registry of a VoIP node are communicated to remaining VoIP nodes in the isolated cluster by broadcasting one or more information packets containing local SIP registry information of the VoIP node.

4. The VoIP-capable network of claim 1, wherein the local SIP registry of a VoIP node is updated according to information received from another VoIP nodes in the isolated cluster in special information packets that each contain local SIP registry information of another VoIP node.

5. The VoIP-capable network of claim 1, wherein each VoIP node has the ability to function as a DHCP server to assign IP addresses to clients in communication with the VoIP node.

6. The VoIP-capable network of claim 5, wherein the IP addresses are assigned from a range of IP addresses produced by a random number generator on each VoIP node.

7. The VoIP-capable network of claim 1, further comprising means of connecting the isolated cluster to an external network, wherein upon connection to an external network, the SIP registry of an external SIP server connected to the external network is updated to include SIP registry information from the VoIP nodes.

8. A method of maintaining VoIP capabilities within a network comprising:
   forming a cluster of two or more initially isolated network nodes
   establishing communications between two or more client devices by way of the initially isolated network nodes, wherein in a first configuration, at least two of said initially isolated network nodes are in communication with each other but not in communication with an external SIP server, and wherein each of said at least two initially isolated network nodes supports VoIP communications based on a local SIP registry contained in each of the said nodes according to the method of:
   communicating with at least one other initially isolated node to exchange SIP registry information;
   updating the local SIP registry in said node as new information is acquired;
   sending and receiving VoIP packets from a sender isolated node to one or more recipient isolated nodes based on said local SIP registry functionality when a client device in communication with the sender node establishes communication with a client device in communication with the recipient node.

9. The method of claim 8 further comprising changing said cluster from the first configuration to a second configuration wherein in the second configuration the said cluster is in communication with an external SIP server containing an external SIP registry; and updating the external SIP registry with the local SIP registries of each of said nodes comprising said cluster.

10. The method of claim 8, further comprising updating the local SIP registries of the isolated nodes as nodes and clients join and leave the isolated cluster.

11. The method of claim 8, wherein updates to the local SIP registry of each node is communicated to remaining nodes in the cluster by broadcasting an information packet containing the local SIP registry information.

12. The method of claim 8, wherein each node functions as a DHCP server to assign IP addresses to clients connected to the node.

13. The method of claim 12, wherein the IP addresses are assigned from a range of IP addresses produced by a random number generator on each node.

14. A VoIP capable network comprising:
   a first initially isolated network node in communication with at least two VoIP clients, wherein the first isolated node further comprises a local SIP registry wherein said SIP registry contains address identifiers for each VoIP clients in communication with the first node; and
   wherein VoIP communication between said at least two VoIP clients are initiated by utilizing the local SIP registry.

15. The VoIP capable network of claim 14, wherein the local SIP registry of the first isolated node is updated as the VoIP clients establish or terminate a network connection with the first isolated node.

16. The VoIP capable network of claim 14, wherein the first isolated node further comprises communications means with other isolated notes wherein the first isolated node broadcasts its SIP registry information to other nodes in communication with the first node.

17. The VoIP capable network of claim 14, wherein first isolated node comes into communication with other isolated nodes to form a cluster, and the local SIP registry information of each isolated node in the cluster is updated according to information received from other isolated nodes in the cluster.

18. The VoIP capable network of claim 14, wherein the first isolated node further comprises a DHCP server to assign IP addresses to clients in communication with the first node.

19. The VoIP-capable network of claim 18, wherein the IP addresses are assigned from a range of IP addresses produced by a random number generator on the first isolated node.

20. The VoIP capable network of claim 18, wherein each node in the cluster has the ability to function as a DHCP server to assign IP addresses to clients connected to that node.

21. The VoIP-capable network of claim 20, wherein each node in the cluster assigns IP addresses from a range of IP addresses produced by a random number generator on that node.

22. The VoIP capable network of claim 14, wherein the information contained in an external SIP server is updated with the local SIP registry of the first isolated node upon establishment of a network connection with an external network containing the external SIP server.

* * * * *